United States Patent
Foley et al.

[11] Patent Number: 5,973,687
[45] Date of Patent: Oct. 26, 1999

[54] GRAPHICAL DISTRIBUTED MAKE TOOL METHODS APPARATUS AND COMPUTER PROGRAM PRODUCTS

[75] Inventors: Jill Foley, San Jose; Sunita Ketineni, Fremont, both of Calif.

[73] Assignee: Sun Microsystems, Inc., Palo Alto, Calif.

[21] Appl. No.: 08/769,620

[22] Filed: Dec. 18, 1996

[51] Int. Cl.⁶ .................................. G06F 3/00; G06F 9/44
[52] U.S. Cl. .......................... 345/334; 345/349; 345/966; 395/701
[58] Field of Search ..................................... 345/349, 966, 345/970, 334; 395/670, 672, 701, 704; 709/100, 102

[56] References Cited

U.S. PATENT DOCUMENTS

| | | | |
|---|---|---|---|
| 5,581,797 | 12/1996 | Baker et al. | 345/326 |
| 5,604,908 | 2/1997 | Mortson | 395/705 |
| 5,649,085 | 7/1997 | Lehr | 345/440 |
| 5,680,530 | 10/1997 | Selfridge et al. | 345/440 |
| 5,731,997 | 3/1998 | Manson et al. | 364/559 |
| 5,845,125 | 12/1998 | Nishimura et al. | 395/704 |

OTHER PUBLICATIONS

Bruce Boardman, "The Next Corporate IS Frontier", Network computing, n718, PG50, pp. 1, 4, and 5, 1996.

*Primary Examiner*—Raymond J. Bayerl
*Assistant Examiner*—X. L. Bautista
*Attorney, Agent, or Firm*—Sabath & Truong; Robert P. Sabath, Esq

[57] ABSTRACT

A make system includes an overlay make tool for graphical presentation of user-friendly data regarding build operations updating multi-file software architecture. The make system includes a make program building files into executable programs, and a make tool which updates files requiring updating according to an update method relying upon a dependency tree and date stamp information.

17 Claims, 5 Drawing Sheets

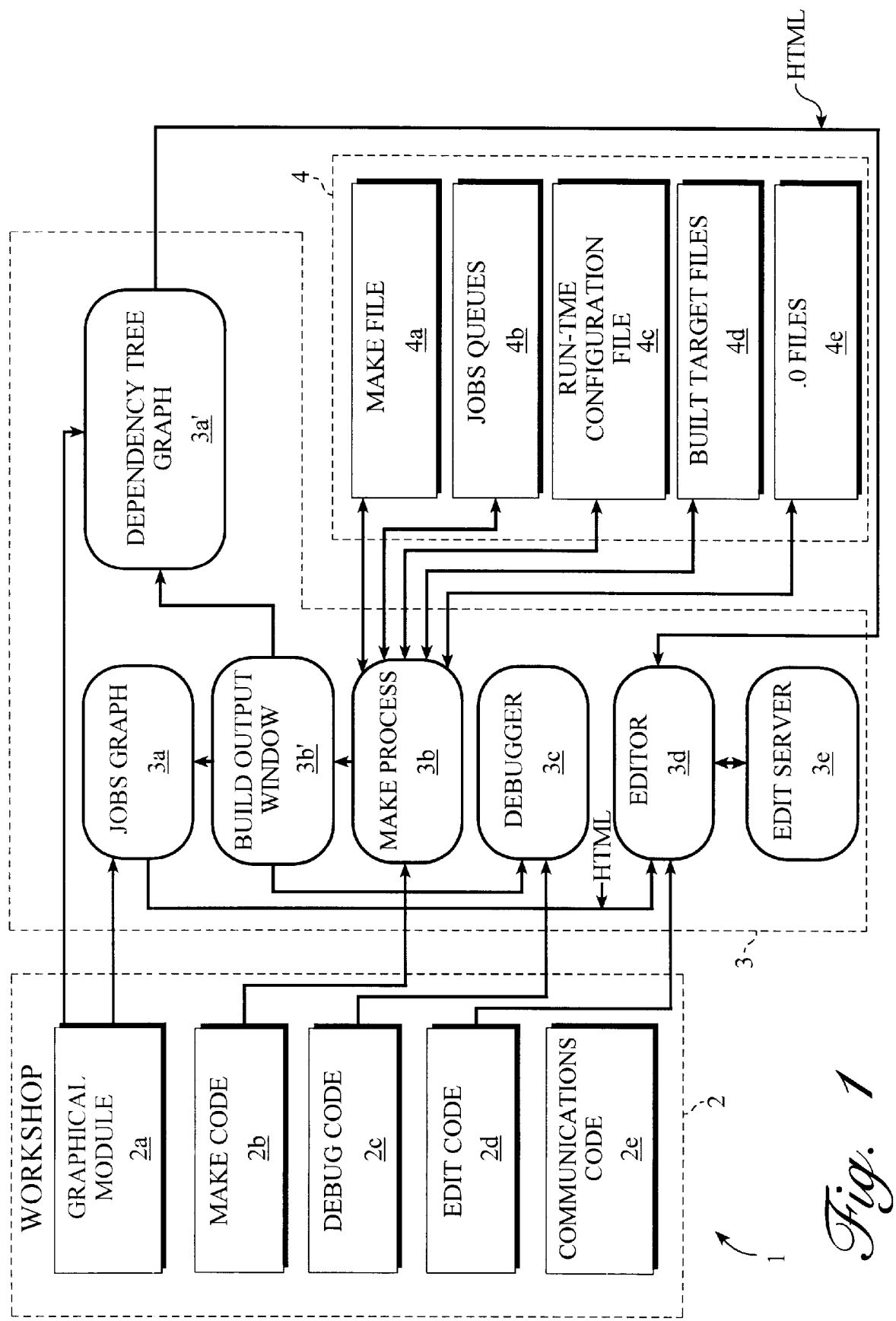

GRAPHICAL DISTRIBUTED MAKE TOOL METHODS APPARATUS AND COMPUTER PROGRAM PRODUCTS

CROSS-REFERENCE TO RELATED APPLICATION

This application is related to first and second patent applications filed on even date herewith on "Distributed Make Methods, Apparatus, and Computer Program Products", U.S. patent application Ser. No. 08/920,934, filed Dec. 18, 1996, by Mitchell Nguyen and Wilmer Walton; and "Job Distribution and Local Balancing Methods, Apparatus, and Computer Program Products," U.S. patent application Ser. No. 08/922,103, filed Dec. 18, 1996, by Mitchell Nguyen. The related applications are hereby expressly incorporated herein by reference in their entirety.

COPYRIGHTS IN PATENT MATERIALS

Portions of this Patent document contain material subject to copyright protection. The copyright owner has no objection to facsimile reproduction of the Patent document after grant as it appears in the U.S. Patent and Trademark Office files and records, but otherwise reserves all rights relating thereto.

FIELD OF THE INVENTION

This invention relates to methods, apparatus, and computer program products relating to software utilities for modifying and reconstituting software file elements and modules into operable form.

BACKGROUND OF THE INVENTION

The UNIX environment includes a bundled "make" utility which runs in the UNIX shell, to enable software having multiple source files to be rebuilt into executable or other final form during maintenance. Software maintenance includes updating and modifying software files and then rebuilding files and code dependent upon the changed files. Software being maintained typically includes multiple independent software modules (e.g., .o's). According to the bundled UNIX "make" utility, rebuilding or "build" is accomplished serially by recompiling one source module at a time and then relinking the resultant object files into an executable software product which can be shipped to the customer. According to the prior current source files can be recompiled in parallel at a selected local data processing machine. The cross-referenced applications incorporated herein provide background and details of a current implementation of make. In particular, the make utility identifies source files to be used in rebuilding, compiles the source files serially or in parallel at a single processing node with a suitable compiler, and links the resultant object files into a new rebuilt executable program or other file. A C++ compiler is used to recompile modified .cc object files. A C compiler is used to recompile modified .c object files.

The make utility is useful because it processes many make jobs during build processing which result in creation of an updated resultant software entity which incorporates changes made in precursor code elements used to construct the final entity. The complexity and the workload of the make utility reduces speed of performance. Accordingly, it would be desirable to develop make methods, apparatus and computer program which speed the build process and enables more speedy and effective software maintenance and file modification operations. Furthermore, the software programmer performing build jobs on multiple files or code elements has little oversight over the status of individual build jobs are completed or interrupted due to error nor on what data processing node a particular job is performed. Additionally, a technical difficulty exists ineffective resolution of errors occurring during make or build jobs. Error diagnosis is thus currently difficult and cumbersome.

SUMMARY OF THE INVENTION

According to the present invention, the progress of make jobs is presented for visual observation on a graphical user display (GUI) by representing the make jobs performed and executed on one or more data processing nodes as time-expandable job presentation elements on a predetermined multidimensional presentation region viewable on the GUI. Each job is represented by a time-expandable job presentation element arranged at an appropriate position within the predetermined presentation region. According to one embodiment of the present invention, the presentation screen is a two dimensional space having x and y coordinates in which the x-coordinate is arranged in a horizontal alignment and the y-coordinate is vertical and perpendicular to the x-coordinate. According to one embodiment, the job presentation elements are elongated along a coordinate axis which represents time, and the magnitude of each elongated job presentation element represents the current time a job has run during execution up to the present moment. When the job has been completed or when it terminates due to an error condition, the length or magnitude of the particular job presentation element is fixed. According to one embodiment, a job presentation element is provided with a selected first color to indicate that the associated job is still executing. Upon completion of the job, the element changes to a selected second color. If the job terminates due to an error condition, the element converts from being represented in the first color into a selected third color. According to the present invention, job presentation elements relating to jobs processed on each data processing node are associated with each other by adjacent sequential positioning. Similarly, job presentation elements relating to jobs processed on different data processing nodes are separated from each other by a predetermined amount of offset within a common predetermined presentation region. According to one embodiment of the present invention, the offset between the position of job presentation elements relating to jobs processed on different data processing nodes is in a horizontal direction. According to one embodiment, job presentation elements relating to next in time order jobs performed on the same data processing node are dovetailed in adjacent positions.

According to the present invention, each job presentation element is a status element for representing the status of an associated job as a job which is currently being processed, as a job which has already been processed and completed, and as a job which has been processed but which has been terminated due to experience of a processing error. Each of these job statuses is associated with a mode or color, according to one embodiment of the present invention. When the status of a job changes from executing to completed or from executing to terminated due to error, then the mode or color changes from one selected state to another. Further according to the present invention, a computer program product graphically presents the performance of make jobs with a mechanism including code devices configured to execute make jobs and to present status information regarding to several make jobs in relationship to each other, both in time and applicable data process node.

According to one embodiment of the present invention, UNIX build operations are displayed graphically in conjunction with text output on a graphical user interface (GUI). Further according to the present invention, a graphical UNIX make tool displays file dependencies in tree format and includes a line graph capability to display progress in completing make and build operations. According to one embodiment of the present invention, graphical make is accomplished with line graphing as an overlay for the UNIX make utility. According to the present invention, clicking at a tree node shown on a GUI permits selected file building, as well as file state and currency (i.e., in or out of date) determination. Even further according to the present invention, make tool provides line graph information expressing jobs in progress and indicating which machines are building particular files.

BRIEF DESCRIPTION OF THE DRAWINGS

FIG. 1 is a diagram of a file workshop system according to the present invention;

FIG. 2c is a flow chart of a tree graph presentation method according to the present invention, including clicking on selected files to show dependencies.

DETAILED DESCRIPTION OF A PREFERRED EMBODIMENT OF THE PRESENT INVENTION

Figure 2A:
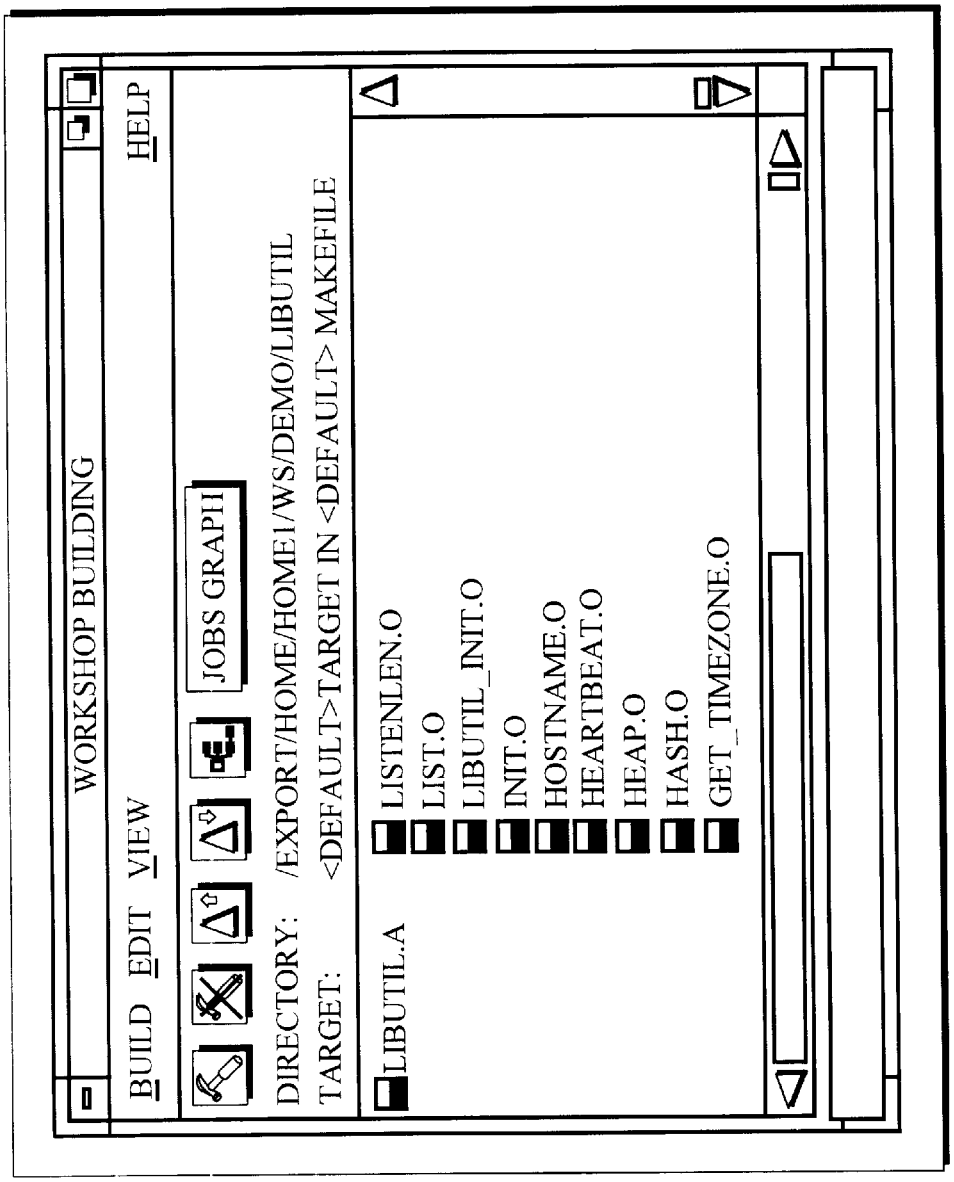
FIG. 2a is a screen print of a presentation window display of selected file dependencies according to the prior art.

FIG. 1 is a diagram of a file workshop system 1 according to the present invention. File workshop system 1 includes a plurality of software code modules 2 including 1a integrated form a graphical module 2a, a make code module 2b, a debug code module 2a, an edit code module 2d, and a communications code module 2e. By running software code of software code module 2 according to a method of the present invention, workshop processes 3 are invoked and run as will be discussed in greater detail below. Workshop processes 3 include jobs graph 3a, file dependency tree graph process 3a', build output window process 3b', make process 3b, debugger process 3c, editor process 3d, and edit server daemon process 3e. Workshop processes 3 ' create and run with data structure and file entities 4 according to the present invention. Data structure and file entities 4 include without limitation a make file 4a, job queues 4b, a runtime configuration file 4a, built target files 4d, and object or o files 4e. New software is created, producing new target source file from a plurality of files including but not limited to object files, i.e., ".o's". The new software which has been built, is then debugged with a user directed debugger process 3c. Debugger process 3c is performed in accordance with instructions provided in debug code module 2c, which may comprise well-known conventional debugging software routines. Debugging identifies "bugs" or errors in the newly created software target files which have been built. The target files built are constructed from subordinate object files which have been compiled and linked into executable or other (e.g., text) file form. To edit or maintain the object files upon which the target software depends, editor process 3c is invoked. Editor process 3d communicates with edit server daemon process 3e to make modifications in 0.0 files to correct errors identified in debugging. Make process 3b uses a make file 4a to identify file dependencies among files which need to be processed to produce a revised built target file 4d. Make process 3b further processes make jobs taken from job queues 4b created in accordance with the dependencies specified in make file 4a. According to one embodiment, make process 3b distributes the make jobs in job queues 4b to a predetermined plurality of data processing nodes for processing to build target files 4d. According to another embodiment, parallel make processes can be run on a single data processing node. The results of running make process 3b are provided to build output window process 3b' from which a jobs graph process 3a, dependency tree graph process 3a', and debugger process 3c can be invoked by the user. Build output window process 3b' produces a command line interface and permits entry of information by the user to specify build objects identified by directory, target names, commands to be invoked including selection of command modifiers including but not limited to variables, macros, and selected command line options. According to the present invention, jobs graph process 3a and dependency tree graph process 3a' are each linked through editor process 3d to modifiable files upon which target files depend, such as .o files 4e, by a hypertext markup language (HTML) link.

FIG. 2a is a screen print of a presentation window display of selected file dependencies according to the prior art. In particular, FIG. 2a shows a workshop build window including a tool bar, task icons, a directory indication, a target line, and a text region showing a listing of object files subject to conventional build operation. The title of the build window is "Workshop Building," which refers to a software suite including conventional build functionality. The window presentation, according to this known technology, conveys only a limited amount of information. The window presentation, however, provides no information about currency status, i.e., whether a particular file is up-to-date or out-of-date. Further, no information is provided regarding file status, i.e., whether build failed or whether particular files indicated are not buildable.

Figure 2B:
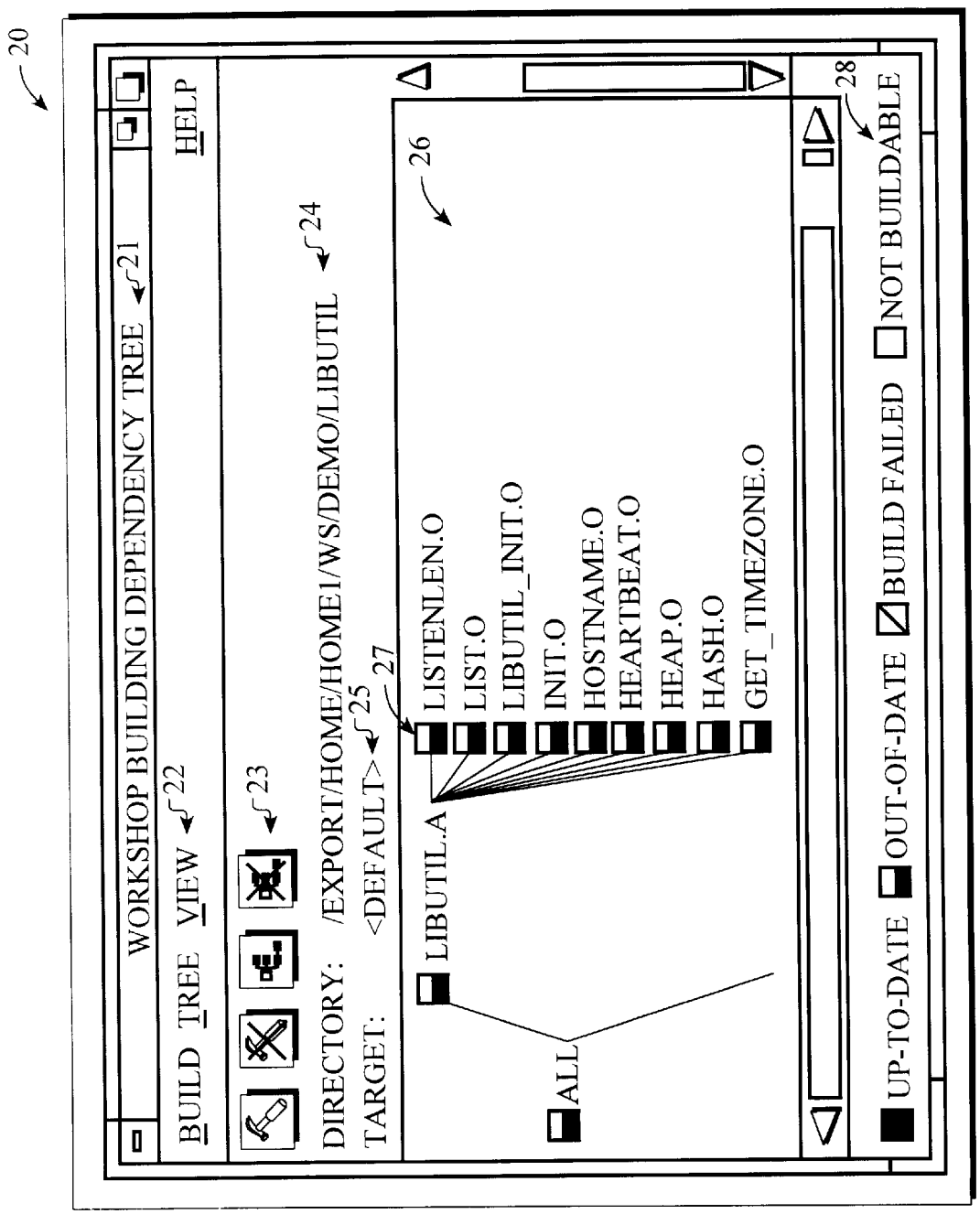
FIG. 2b is a screen print of a tree status graph of files subject to make operation, in accordance with the present invention.
Figure 26:
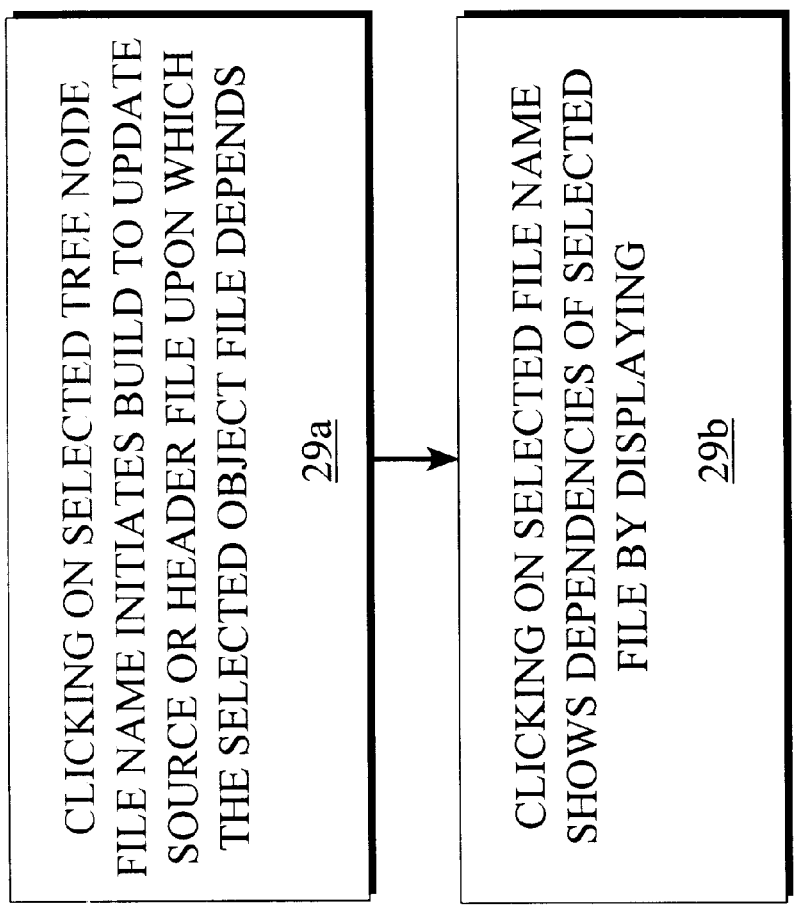

FIG. 2b is a screen print of a dependency tree graph 20 of the names of files subject to make operation, in accordance with the present invention. In particular, FIG. 2b shows dependency tree graph 20 including a header 21, a menu 22, task icons 23, a directory indication 24, a target line 25, and a graph region 26 in which a dependency tree of files subject to make operation is presented in terms of their interdependencies. Each file name is shown associated with a rectangular icon 27 according to a legend 28 at the underside of the dependency tree graph window indicative of file currency and status. For example, object files listelem.o-heap.o are shown out-of-date, while object files hash.o-get_timezone.o are shown to be up-to-date. No files are indicated as build failed or as not buildable. All of these files are dependencies of libutil.a, and all is a dependency of libutil.a. Since some of the files from listelem.o-get_timezone.o are out-of-date, it follows that libutil.o and all will have an icon indication of their being out-of-date as well. This status is expressly visually apparent from the tree organization shown in the user-friendly presentation in FIG. 2b.

FIG. 2c is a flow chart of a dependency tree presentation method 29 according to the present invention. According to the present invention, clicking 29 on a selected tree node file name initiates build operation according to the present invention, to update the source and header files upon which the selected object file depends. Further, clicking 29b on a selected object file name causes presentation of the names of the source and header files upon which the selected file depends.

Figure 3:
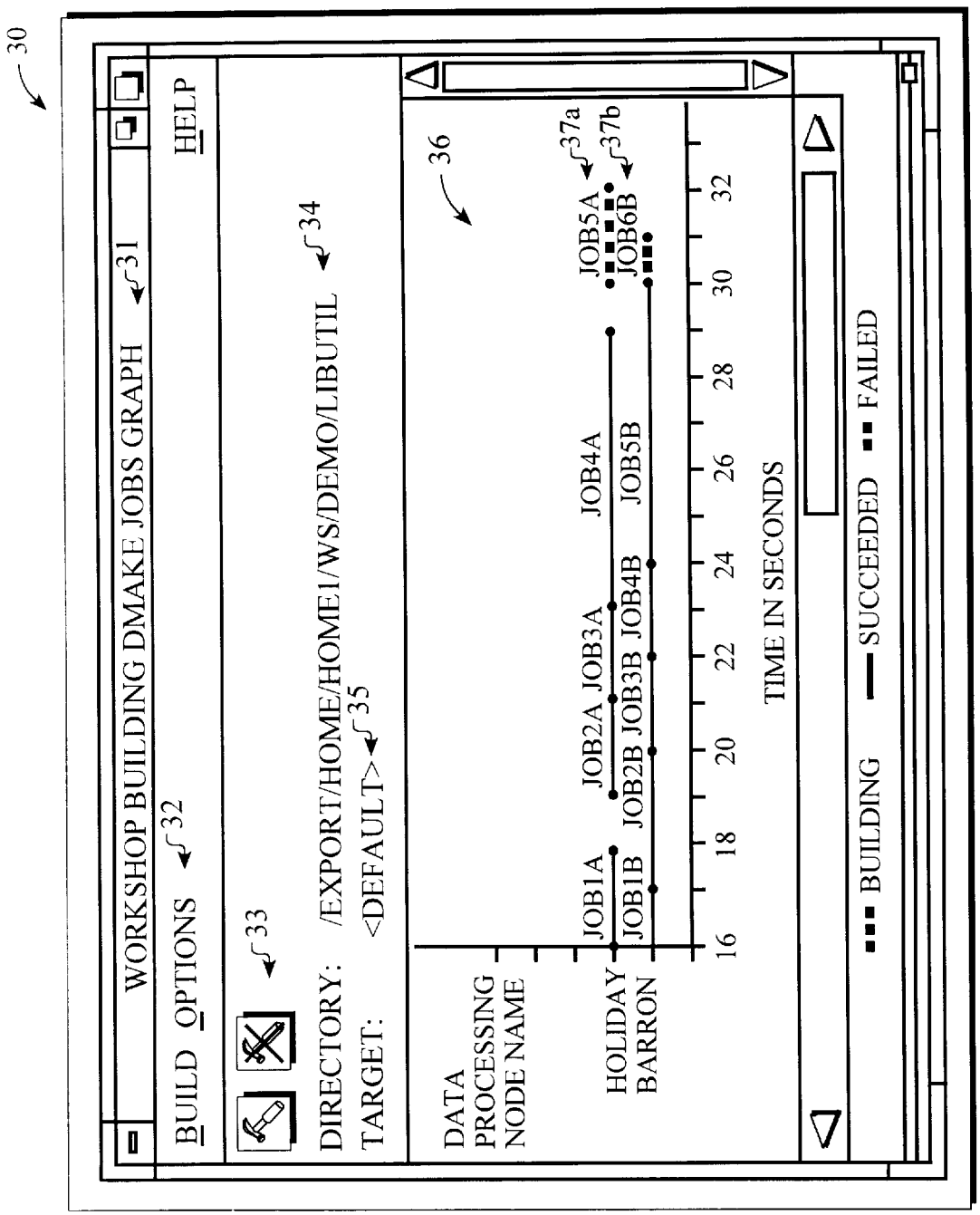
FIG. 3 is a screen print of line graphs of files subject to make operation, in accordance with the present invention.

FIG. 3 is a screen print of line graphs of files subject to make operation, in accordance with the present invention. In particular, FIG. 3 shows a jobs graph 30 including a header 31, a menu 32, task icons 33, a directory indication 34, a target line 35, and a two dimensional graph region 36 in which first and second line graphs, respectively 37a and 37b, illustrate build status in a job-by-job basis, as a function of time in seconds. Each of line graphs 37a and 37b comprises a series of job presentation elements or segments which have a limited thickness or width, but each of which has a length corresponding to the processing time consumed in executing or running the job associated with the element. Each element can exhibit a mode or color, according to the status of the job as running, failed, or completed. According to one embodiment, a running job is represented by a solid segment or the color green, as it grows or extends as a function of time. As shown in FIG. 3, make jobs are being performed on first and second data processing nodes, respectively named "holiday" and "barrone." Running on first data processing node "holiday" are jobs named JOB1A–JOB5A. Running on second data processing node "barrone" are jobs named JOB2B–JOB6B. As can be seen, at time 16 JOB1A has begun running and has continued to run for two seconds until it has succeeded in completing the specified task or tasks associated with the job. Then, for one second, data processing node "holiday" ceases processing. Thereafter, at time 19, JOB2A starts and upon its completion at time 21, JOB3A starts and continues processing until time 23, when JOB4A starts and continues processing until time 29. Again, data processing node "holiday" ceases operation, only to start up again at time 30 with JOB5A which is still building, i.e., in process at the moment the screen shot of FIG. 3 is captured. Parallel jobs named JOB1B–JOB6B have run or have failed as indicated for data processing node "barrone." As shown in FIG. 3, JOB1B has started prior to time 16. Earlier job data is not provided in the present setting of the job graph limited to times from 16 seconds to 33 seconds. As further shown, JOB6B has failed. The earlier jobs handled by "barrone" have succeeded serially without "barrone" halting processing at any time.

By clicking on the job processing element for JOB 6B, according to one embodiment of the present invention, a pull-up screen can be shown which presents a table of error diagnostics which are the reasons for the failure of JOB 6B. Further according to the present invention, selected words in the error diagnosis table are hyperlinked to modifiable code in files which are subject to edit operation in accordance with the present invention. The appendix contains an embodiment of hypertext markup language (HTML) code to permit the linkage to code containing errors which can be corrected by edit operations according to the present invention. The appendix which follows further includes code to implement graphs in accordance with the present invention. The portion of the appendix entitled "mt_graph.cc" is code for graph generation, and the portion entitled "BuildOutputHTML.cc" is the code for facilitating hyperlink corrections to code needing to be modified to prevent occurrence of error conditions.

What is claimed is:

1. A computer implemented method of graphically presenting the performance of a plurality of make jobs being executed by at least one data processing mode, comprising:

presenting status information regarding processing said plurality of make jobs as a function of dependencies between ones of said plurality of make jobs, said status information including at least one of build failure status and non-buildable status;

presenting first status information regarding processing a first one of said plurality of make jobs as a first function of time, at a selected first position within a predetermined presentation region having at least a single dimension; and presenting second status information regarding a second one of said plurality of make jobs as a second function of time, at a second position within said predetermined presentation region.

2. A computer implemented method according to claim 1, further including presenting said first and second status information regarding said first and second ones of the plurality of make jobs adjacently to each other within said presentation region.

3. A computer implemented method according to claim 1, including offsetting said second position from said first position to present said first and second status information with respect to make jobs performed with different ones of said at least one data processing node, at predetermined intervals along a selected dimension of said common presentation region.

4. A computer implemented method according to claim 3, including offsetting the first and second positions of said respective first and second ones of the plurality of make jobs from each other in a horizontal direction.

5. A computer implemented method according to claim 3, including offsetting the first and second positions of said respective first and second ones of the plurality of make jobs in a vertical direction.

6. A computer implemented method according to claim 1, including dovetailing the presentation of said ones of the plurality of make first and second status information when performed on a single data processing node, so as to display a first indication of performance of said first one of the plurality of make jobs at said first position followed by a second indication of performance of said second one of the plurality of make jobs after said first display location.

7. A computer implemented method according to claim 1, including presenting first and second status information regarding job performance with a similar status element type representing jobs being processed, jobs successfully having been processed and completed, and jobs processed by subject to processing error.

8. A computer implemented method according to claim 1, including presenting status information regarding respective jobs being processed, in a selected color to indicate job processing is currently in progress.

9. A computer implemented method according to claim 1, including presenting status information regarding jobs being processed, in a selected color to indicate job processing has successfully been completed.

10. A computer implemented method according to claim 1, including presenting status information regarding jobs being processed, in a selected color to indicate job processing is subject to error.

11. A computer implemented method according to claim 1, including presenting job status information for jobs currently being processed with a time function expanding element.

12. A method according to claim 3, including changing the color of status information to reflect a change in processing status.

13. A computer program product, comprising:

a computer storage medium and a computer code mechanism embedded in the computer storage medium for graphically presenting the performance of make jobs, the computer program code mechanism comprising:

a first computer code device configured to execute first and second make jobs with at least a single data processing node;

a second computer code device configured to present status information regarding said first and second make jobs at respective first and second positions within a predetermined graphical presentation region; and a third computer code device configured to present status information regarding processing said make jobs as a function of dependency between ones of the make jobs, said status information including at least build failure status and non-buildable status.

14. A computer apparatus comprising at least a single data processing node configured to execute a plurality of make jobs, at least one of said at least a single data processing node further being configured to present first status information about said plurality of make jobs within a multidimensional graphical presentation region receiving real-time information about the job status of said respective jobs, said first status information being presented as a function of time and the identity of the particular one of said at least a single data processing node which performs particular job processing at least one of said, at least a single data processing node further being configured to present second status information regarding processing said make jobs as a function of dependancy between ones of the make jobs, said status information including build failure status and non-buildable status.

15. A computer implemented method for presenting make job performance information including:

providing a mechanism for executing make jobs;

presenting status information regarding processing said plurality of make jobs as a function of dependencies between ones of said plurality of make jobs, said status information including at least one of build failure status and non-buildable status; and presenting time and status varying information on each make job executed according to actual make job performance sequence, on a predetermined presentation region.

16. A computer implemented method of responding to a failed make job in a first graphical representation of the progress of make jobs in which each make job is represented by a first hyperlink activable job representation element which has a magnitude corresponding to the time to complete processing or the time to job failure or in a second graphical representation of the progress of make jobs in which each make job is represented by a second hyperlink activable job representation element which has a symbol indicative of a build failure status or a non-buildable status, comprising:

activating a selected hyperlink activable job representation element; and linking to job associated code causing the job failure.

17. The method of claim 16 further comprising displaying said job associated code to allow changes to said code.

* * * * *